US012410919B2

(12) United States Patent
Gomez Bachiller et al.

(10) Patent No.: US 12,410,919 B2
(45) Date of Patent: Sep. 9, 2025

(54) COOKTOP DEVICE

(71) Applicant: BSH Hausgeräte GmbH, Munich (DE)

(72) Inventors: Patricia Gomez Bachiller, Saragossa (ES); Oscar Gracia Campos, Saragossa (ES); Damaso Martin Gomez, Saragossa (ES); Pilar Perez Cabeza, Saragossa (ES); Jesús Ricardo Ruiz Gracia, Movera (ES); Noelia Vela Pardos, Saragossa (ES)

(73) Assignee: BSH Hausgeräte GmbH, Munich (DE)

(*) Notice: Subject to any disclaimer, the term of this patent is extended or adjusted under 35 U.S.C. 154(b) by 876 days.

(21) Appl. No.: 17/636,381

(22) PCT Filed: Aug. 25, 2020

(86) PCT No.: PCT/EP2020/073697

§ 371 (c)(1),
(2) Date: Feb. 18, 2022

(87) PCT Pub. No.: WO2021/043625

PCT Pub. Date: Mar. 11, 2021

(65) Prior Publication Data

US 2022/0316713 A1 Oct. 6, 2022

(30) Foreign Application Priority Data

Sep. 6, 2019 (EP) .................................... 19382770

(51) Int. Cl.

| | |
|---|---|
| ***F24C 15/10*** | (2006.01) |
| ***F24C 7/08*** | (2006.01) |
| ***H05B 6/12*** | (2006.01) |

(52) U.S. Cl.

CPC ............ *F24C 15/102* (2013.01); *F24C 7/083* (2013.01); *H05B 6/1218* (2013.01)

(58) Field of Classification Search

CPC ....... F24C 15/102; F24C 7/083; H05B 6/1218

See application file for complete search history.

(56) References Cited

U.S. PATENT DOCUMENTS

| | | | | |
|---|---|---|---|---|
| 2007/0295711 | A1* | 12/2007 | Striegler | C03C 17/10 219/448.11 |
| 2017/0241635 | A1* | 8/2017 | Guiset | F24C 15/105 |
| 2020/0374990 | A1* | 11/2020 | Azuara Gazo | H05B 6/1272 |

FOREIGN PATENT DOCUMENTS

| | | | |
|---|---|---|---|
| DE | 102018120740 | A1 * | 2/2019 |

OTHER PUBLICATIONS

International Search Report PCT/EP2020/073697 dated Oct. 22, 2020.

* cited by examiner

*Primary Examiner* — Edward F Landrum

*Assistant Examiner* — Kuangyue Chen

(74) *Attorney, Agent, or Firm* — Michael E. Tschupp; Andre Pallapies; Brandon G. Braun

(57) ABSTRACT

A hob device includes a plate unit including a plate main body, which has a plate side with an at least substantially smooth surface in a surface portion, a first layer unit arranged in a first sub-region of the surface portion and being at least substantially non-transparent, and a second layer unit arranged in a second sub-region of the surface portion and designed to scatter light.

13 Claims, 3 Drawing Sheets

COOKTOP DEVICE

CROSS-REFERENCES TO RELATED APPLICATIONS

This application is the U.S. National Stage of International Application No. PCT/EP2020/073697, filed Aug. 25, 2020, which designated the United States and has been published as International Publication No. WO 2021/043625 A1 and which claims the priority of European Patent Application, Serial No. 19382770.6, filed Sep. 6, 2019, pursuant to 35 U.S.C. 119(a)-(d).

The contents of International Application No. PCT/EP2020/073697 and European Patent Application, Serial No. 19382770.6 are incorporated herein by reference in their entireties as if fully set forth herein.

BACKGROUND OF THE INVENTION

The invention relates to a hob device.

A hob which has a plate unit with a plate main body is already known from the prior art. In a mounted state, a first layer unit which is configured to be non-transparent is arranged on a plate side of the plate main body in a first sub-region of a surface portion of the plate side. In a mounted state, a second layer unit which is configured to be transparent is arranged in a second sub-region of the surface portion. In an installed position, a light source which provides light in an operating state is arranged below the second sub-region. In the operating state, the second sub-region permits the light provided by the light source to pass unhindered, whereby a user is able to perceive the light above the plate unit.

BRIEF SUMMARY OF THE INVENTION

The object of the invention, in particular, is to provide a generic device with improved properties relative to lighting but is not limited thereto.

A hob device, in particular an induction hob device, is proposed, comprising at least one plate unit, which plate unit has at least one plate main body, which has an at least substantially smooth surface in at least one surface portion on at least one plate side, at least one first layer unit which is arranged in at least one first sub-region of the surface portion and is at least substantially non-transparent, and at least one second layer unit which is arranged in at least one second sub-region of the surface portion, advantageously adjoining the first sub-region, and is provided for scattering light.

In particular, optimized lighting may be achieved by means of such an embodiment. For example, advantageously optimized lighting properties and/or uniform lighting may be provided by the second layer unit and/or by the at least substantially smooth surface. The optimized lighting properties could have, for example, targeted and/or uniform lighting and could be provided, for example, for lighting at least one symbol. An afterglow which, for example, could result at least partially from a reflection on the plate side and/or viewing into a hob interior may, in particular, be avoided. For example, by means of the at least substantially smooth surface, in particular, a low degree of light scattering and/or light influence may be achieved by the surface portion, whereby for example optimized lighting properties and/or an optimized external appearance may be provided. For example, in particular a hotspot effect, which could be produced, for example, by specific light sources, such as for example LEDs, may be avoided by means of the second layer unit and namely, in particular, by avoiding additional components.

A "hob device", advantageously an "induction hob device", is intended to be understood to mean, in particular, at least one part, in particular a subassembly, of a hob, advantageously of an induction hob.

A "plate unit" is intended to be understood to mean, in particular, a unit which has at least one longitudinal extension and at least one transverse extension and at least one thickness which is substantially smaller than the longitudinal extension and than the transverse extension. For example, the longitudinal extension and/or the transverse extension could, for example, in each case be at least 2 times, in particular at least 5 times, advantageously at least 8 times, particularly advantageously at least 12 times, preferably 20 times and particularly preferably at least 50 times as large as the thickness. The plate unit, when viewed perpendicular to a main extension plane of the plate unit, could have an oval and/or circular and/or n-cornered shape, for example. When viewed perpendicular to a main extension plane of the plate unit, the plate unit advantageously has a rectangular and/or a square shape.

A "longitudinal extension" of an object is intended to be understood to mean, in particular, an extension of the object in a longitudinal direction of extension of the object. An "extension" of an object is intended to be understood to mean, in particular, a maximum spacing between two points of a perpendicular projection of the object onto a plane. A "longitudinal direction of extension" of an object is intended to be understood to mean, in particular, a direction which is oriented parallel to a longest side of a smallest imaginary geometric cuboid which only just completely encloses the object. A "transverse extension" of an object is intended to be understood to mean, in particular, an extension of the object in a transverse direction of extension of the object. A "transverse direction of extension" of an object is intended to be understood to mean, in particular, a direction which is oriented parallel to a second longest side of a smallest imaginary geometric cuboid which only just completely encloses the object. A "thickness" of an object is intended to be understood to mean, in particular, an extension of the object in a thickness direction of the object. A "thickness direction" of an object is intended to be understood to mean, in particular, a direction which is oriented parallel to a smallest side of a smallest imaginary geometric cuboid which only just completely encloses the object.

A thickness of an object could, for example, be identical to a material thickness of the object. Advantageously, a thickness of an object is oriented perpendicular to a longitudinal extension of the object and to a transverse extension of the object. A longitudinal extension of an object and a transverse extension of the object are advantageously oriented perpendicular to one another.

A "main extension plane" of a structural unit is intended to be understood to mean, in particular, a plane which is parallel to a largest side surface of a smallest imaginary cuboid which only just completely encloses the structural unit and advantageously runs through the center point of the cuboid.

A "plate main body" of the plate unit is intended to be understood to mean, in particular, a unit which defines and/or characterizes an outer shape of the plate unit at least to a large part and/or which has at least a large part of a mass of the plate unit and/or a volume of the plate unit. "At least to a large part" is intended to be understood to mean, in particular, in a proportion, in particular, a mass proportion and/or a volume proportion and/or a proportion of a number, of at least 70%, in particular of at least 80%, advantageously of at least 90% and preferably of at least 95%.

The plate side of the plate main body is advantageously oriented at least substantially parallel to a main extension plane of the plate main body. In an installed position, the plate side could form, for example, a side of the plate main body facing a user and/or a visible side of the plate main body. Advantageously, in an installed position the plate side could form a side of the plate main body facing away from the user and/or a rear side of the plate main body. "At least substantially parallel" is intended to be understood to mean, in particular, an orientation of a direction relative to a reference direction, advantageously in one plane, wherein the direction has a deviation relative to the reference direction, for example, of a maximum of 8°, advantageously a maximum of 5° and particularly advantageously a maximum of 2°.

For example, the surface portion could extend over a proportion of a maximum of 60%, in particular of a maximum of 50%, advantageously of a maximum of 40%, particularly advantageously of a maximum of 30%, preferably of a maximum of 20% and particularly preferably of a maximum of 10% of a surface extension of the plate main body on the plate side. Particularly advantageously, the surface portion extends over at least a large part of a surface extension of the plate main body on the plate side. The surface portion extends, for example, over a proportion of at least 65%, in particular of at least 75%, advantageously of at least 80%, particularly advantageously of at least 85%, preferably of at least 90% and particularly preferably of at least 95% of a surface extension of the plate main body on the plate side.

An "at least substantially smooth" surface is intended to be understood to mean, in particular, a surface which has a roughness of a maximum of 300 nm, in particular of a maximum of 200 nm, advantageously of a maximum of 150 nm, particularly advantageously of a maximum of 120 nm, preferably of a maximum of 100 nm and particularly preferably of a maximum of 80 nm. For example, a roughness spacing which defines a spacing between two points of the surface of the plate main body at a maximum distance from one another and which is oriented at least substantially parallel to a thickness of the plate main body, could correspond to a value of the roughness. Advantageously, a roughness of the plate main body may be understood to mean an unevenness of a surface height of the plate main body. The unevenness of the surface height of the plate main body could correspond, for example, to a value of the roughness.

The hob device advantageously has at least one light source which is provided for providing light. In an installed position the light source is advantageously arranged on a side of the plate unit facing away from a user. In a mounted state, the light source is advantageously arranged on a side of the plate unit facing the plate side. "Light", in particular visible light, is intended to be understood to mean, in particular, electromagnetic radiation having a wavelength of at least 380 nm and of a maximum of 750 nm. Advantageously, the light is configured as visible light. For example, in addition to the visible light, the light source could be provided, for example, for providing ultraviolet radiation and/or infrared radiation.

A "layer unit" is intended to be understood to mean, in particular, a unit which has at least one layer. The layer unit and/or the layer advantageously has a material thickness which is substantially smaller than a thickness and/or than a material thickness of at least one base unit, such as for example of the plate main body, on which the layer unit and/or the layer is arranged in a mounted state. The base unit is advantageously a unit on which the layer unit is arranged in a mounted state. Particularly advantageously, the base unit is formed by the plate main body. For example, a thickness of the base unit and/or of the plate main body could be at least 2 times, in particular at least 5 times, advantageously at least 8 times, particularly advantageously at least 12 times, preferably 20 times and particularly preferably at least 50 times as large as a material thickness of the layer unit and/or the layer which is arranged, for example, on the base unit and/or on the plate main body in a mounted state.

For example, the layer unit and/or the layer could be attached at least in some portions indirectly to the plate main body. Advantageously, the layer unit and/or the layer could be attached at least in some portions directly to the plate main body. The layer unit and/or the layer could advantageously be configured to be self-adhesive.

For example, the layer unit could have at least one and, for example, exactly one layer. The layer unit could have, for example, at least two, advantageously at least three, particularly advantageously at least four, preferably at least five and particularly preferably a plurality of layers. Advantageously, a value of a material thickness of the layer unit could correspond at least substantially to a value of a sum of the material thicknesses of the individual layers of the layer unit, advantageously all of the layers of the layer unit. "At least substantially" may be advantageously understood to mean in this context that a deviation from a predetermined value is, in particular, a maximum of 25%, preferably a maximum of 10% and particularly preferably a maximum of 5% of the predetermined value.

The phrase that an object "is at least substantially non-transparent" is intended to be understood to mean, in particular, that the object is non-transparent for at least a large part of a wavelength range of electromagnetic radiation and/or visible light and, for example, could be partially transparent for at least one wavelength. For example, at least one layer of the layer unit could be at least substantially non-transparent. Preferably, the first layer unit is non-transparent. For example, in the case of at least one layer of the first layer unit, which could be at least substantially non-transparent, the first layer unit could have at least two, in particular at least three, advantageously at least four, preferably at least five and particularly preferably a plurality of layers in order, in particular, to prevent a partial transparency and/or to ensure a non-transparency thereby.

The first layer unit is provided, in particular, to prevent an escape of light from a hob interior at least substantially and advantageously at least up to a radiation density of at least 480 $W/m^2$. In particular, the first layer unit is provided to prevent, in particular at least substantially, and to prevent advantageously, viewing into a hob interior.

For example, the second layer unit scatters light emitted, in particular, from the light source, relative to at least one, in particular any, point on a surface of the second layer unit facing the plate main body in a mounted state, over a solid angle of at least $\pi$, in particular, of at least $3\pi/2$ and advantageously of at least $2\pi$. Advantageously, the second layer unit scatters light emitted, in particular, from the light source, relative to at least one, in particular any, point on a surface of the second layer unit facing the plate main body in at least substantially an entire hemisphere facing the plate main body in a mounted state. As a result, in particular, particularly diffuse, well-distributed light may be provided, whereby, in particular, a particularly advantageous lighting may be achieved.

"Provided" is intended to be understood to mean, in particular, specially programmed, designed and/or equipped. By an object being provided for a specific function is intended to be understood to mean, in particular, that the object fulfils and/or performs this specific function in at least one use state and/or operating state.

It is further proposed that the first sub-region, when viewed perpendicular to a main extension plane of the plate unit, extends over at least a large part of the plate main body. The first sub-region, when viewed perpendicular to a main extension plane of the plate unit, could extend, for example, over a proportion of at least 60%, in particular of at least 70%, advantageously of at least 80%, particularly advantageously of at least 85%, preferably of at least 90%, and particularly preferably of at least 95% of a surface extension of the surface portion and advantageously of the plate side. As a result, in particular, viewing into a hob interior may be prevented, advantageously by structurally simple means. In particular, a simple mounting and/or manufacture may be permitted, whereby for example low costs may be achieved.

The first layer unit could have, for example, a thickness which could correspond at least substantially to a thickness of the second layer unit. For example, alternatively the first layer unit could have, for example, a thickness which could be smaller than a thickness of the second layer unit. Preferably, the first layer unit has a thickness which is larger than a thickness of the second layer unit. For example, the thickness of the first layer unit could be at least 1.1 times, in particular at least 1.3 times, advantageously at least 1.6 times, particularly advantageously at least 2 times, preferably at least 2.4 times and particularly preferably at least 2.7 times as large as the thickness of the second layer unit. The thickness of the first layer unit could, for example, have a value of a maximum of 100 μm, in particular of a maximum of 80 μm, advantageously of a maximum of 60 μm, particularly advantageously of a maximum of 50 μm, preferably of a maximum of 40 μm and particularly preferably of a maximum of 30 μm. The thickness of the second layer unit could have, for example, a value of a maximum of 50 μm, in particular of a maximum of 40 μm, advantageously of a maximum of 30 μm, particularly advantageously of a maximum of 20 μm, preferably of a maximum of 15 μm and particularly preferably of a maximum of 12 μm. As a result, in particular, an optimized construction and/or a high degree of flexibility, for example when selecting a thickness of the first layer unit, may be achieved.

It is further proposed that the plate main body has an at least substantially smooth surface in at least one further surface portion on at least one further plate side, which is arranged opposing the plate side, advantageously relative to a thickness of the plate main body. The further plate side of the plate main body is advantageously at least substantially oriented parallel to a main extension plane of the plate main body. In an installed position, the further plate side, for example, could form a side of the plate main body facing away from a user and/or a rear side of the plate main body. Advantageously, in an installed position the further plate side could form a side of the plate main body facing a user and/or a visible side of the plate main body. Advantageously, in an installed position the light source is arranged on a side of the plate main body facing away from the further plate side. For example, the further surface portion could extend over a proportion of a maximum of 60%, in particular of a maximum of 50%, advantageously of a maximum of 40%, particularly advantageously of a maximum of 30%, preferably of a maximum of 20% and particularly preferably of a maximum of 10% of a surface extension of the plate main body on the further plate side. Particularly advantageously, the further surface portion extends over at least a large part of a surface extension of the plate main body on the further plate side. The further surface portion extends, for example, over a portion of at least 65%, in particular of at least 75%, advantageously of at least 80%, particularly advantageously of at least 85%, preferably of at least 90% and particularly preferably of at least 95% of a surface extension of the plate main body on the further plate side. As a result, in particular, a small degree of light scattering and/or light influence may be achieved by the further surface portion, whereby optimized lighting properties and/or an optimized external appearance may be provided, for example.

For example, the first sub-region and the second sub-region, in particular when viewed perpendicular to a main extension plane of the plate unit, could be arranged so as to be overlapping at least in some portions. Particularly advantageously, the first sub-region and the second sub-region, in particular when viewed perpendicular to a main extension plane of the plate unit, are arranged at least in some portions, advantageously at least to a large part and particularly advantageously entirely without overlapping. The first sub-region and the second sub-region, when viewed perpendicular to a main extension plane of the plate unit, advantageously form different portions from one another of the surface portion. Preferably the first sub-region and the second sub-region, in particular when viewed perpendicular to a main extension plane of the plate unit, adjoin one another at least in some portions. For example, the second sub-region, in particular when viewed on a main extension plane of the plate unit, could enclose and/or surround the first sub-region at least in some portions. The first sub-region surrounds and/or encloses the second sub-region, in particular when viewed on a main extension plane of the plate unit, advantageously at least in some portions. The phrase that at least one sub-region and at least one further sub-region adjoin one another "at least in some portions", is intended to be understood to mean, in particular, that at least one portion of the sub-region and at least one portion of the further sub-region adjoin one another and, for example, the sub-region could have at least one second portion which could not be adjoined to the second sub-region. As a result, in particular, a particularly advantageous and/or compact embodiment may be achieved, in which advantageously gaps may be avoided between the sub-regions.

It is also proposed that the plate unit has at least one third layer unit which is provided, in particular, to filter at least partially, in particular to filter at least to a large part and to filter advantageously, light emitted by the light source. Advantageously, in an operating state the third layer unit could filter at least partially, in particular filter at least to a large part, and filter advantageously, light emitted by the light source. The phrase that the third layer unit is provided to filter light "at least partially" is intended to be understood to mean, in particular, that in an operating state the third layer unit filters at least one wavelength range of the light and, for example, could permit at least one further wavelength range of the light to pass through unhindered. The third layer unit has, in particular, at least one filter function, by means of which the third layer unit, in particular, at least partially filters light emitted by the light source. For example, with the filter function the third layer unit could at least partially scatter and/or at least partially absorb and/or at least partially transmit light. With the filter function, the third layer unit could, for example, at least partially influence a propagation direction of light and/or allow it to be at least partially uninfluenced. As a result, in particular, an optimal and/or specifically adjustable lighting and/or visibility may be permitted, whereby advantageously a high degree of freedom of design may be achieved during manufacture.

It is further proposed that the third layer unit is arranged in at least one third sub-region of the surface portion advantageously adjoining the first sub-region. In particular, the third sub-region differs from the first sub-region and/or from the second sub-region. As a result, in particular, a high degree of flexibility and/or a high degree of freedom of design may be permitted.

For example, the first sub-region and the third sub-region, in particular when viewed perpendicular to a main extension plane of the plate unit, could be arranged so as to be overlapping at least in some portions. Particularly advantageously, the first sub-region and the third sub-region, in particular when viewed perpendicular to a main extension plane of the plate unit, are arranged without overlapping at least in some portions, advantageously at least to a large part and particularly advantageously entirely. The first sub-region and the third sub-region, when viewed perpendicular to a main extension plane of the plate unit, advantageously form different portions from one another of the surface portion. Preferably, the first sub-region and the third sub-region, in particular when viewed perpendicular to a main extension plane of the plate unit, adjoin one another at least in some portions. For example, the third sub-region, in particular when viewed on a main extension plane of the plate unit, could surround and/or enclose the first sub-region at least in some portions. The first sub-region surrounds and/or encloses the third sub-region advantageously at least in some portions, in particular when viewed on a main extension plane of the plate unit. As a result, in particular, a particularly advantageous and/or compact embodiment may be achieved.

It is also proposed that the third layer unit is provided, for example at least in an inactivity mode and particularly advantageously by means of the filter function, to prevent at least partially, in particular to prevent at least to a large part and to prevent advantageously, an escape of light from a hob interior. A "hob interior" is intended to be understood to mean, in particular, a region which is defined and/or delimited by at least one hob external housing and which, in particular, is configured as a hollow space and which, in particular, is provided for bearing at least one hob component. In particular, the hob device has at least one housing unit which at least partially delimits and/or defines the hob interior in a mounted state and which, in particular, forms and/or defines at least one part of the hob external housing in a mounted state. In a mounted state, the housing unit delimits and/or defines the hob interior, in particular, together with the plate unit. In a mounted state, the plate unit delimits and/or defines, in particular, at least one part of the hob external housing. As a result, in particular, an escape of light from the hob interior may be prevented, whereby advantageously an attractive external appearance may be provided.

It is further proposed, for example in at least one operating mode and particularly advantageously by means of the filter function, that the third layer unit is provided to permit at least partially, in particular to permit at least to a large part and to permit advantageously, an escape of light from a hob interior. As a result, in particular, an optimal visibility of lighting may be guaranteed, whereby for example important instructions and/or information may be output for an operation and/or, in particular, a particularly high safety standard and/or a particularly high degree of operating convenience may be provided.

The first layer unit could have, for example, a thickness which could be larger than a thickness of the third layer unit. For example, alternatively, the first layer unit could have a thickness, for example, which could be smaller than a thickness of the third layer unit. Preferably, the first layer unit has a thickness which at least substantially corresponds to a thickness of the first layer unit. For example, a quotient of a smaller of the thicknesses, for example the thickness of the first layer unit or the thickness of the third layer unit, and a larger of the thicknesses, for example the thickness of the third layer unit or the thickness of the first layer unit, could assume and/or have a value of at least 0.9, in particular of at least 0.92, advantageously of at least 0.94, particularly advantageously of at least 0.96, preferably of at least 0.98 and particularly preferably of at least 0.99. The thickness of the third layer unit could, for example, have a value of a maximum of 100 μm, in particular of a maximum of 80 μm, advantageously of a maximum of 60 μm, particularly advantageously of a maximum of 50 μm, preferably of a maximum of 40 μm and particularly preferably of a maximum of 30 μm. As a result, in particular, an advantageous construction may be achieved.

It is also proposed that the third layer unit at least participates in at least one identification of at least one operating region. In particular, the first layer unit and/or the light source participates in the identification of the operating region, in particular, in addition to the third layer unit. When viewed perpendicular to a main extension plane of the plate unit, the third layer unit, in particular, is arranged so as to be overlapping at least in some portions with at least one operating region. The third layer unit, for example when viewed perpendicular to a main extension plane of the plate unit, could be arranged at least partially, advantageously at least to a large part and preferably entirely inside a surface extension spanned by the operating region. In particular, the hob device has at least one user interface which in an installed position is arranged below the operating region and/or which defines at least partially, advantageously at least to a large part and preferably entirely the operating region. For example, the light source could be integrated at least partially in the user interface. The user interface could have, for example, at least one lighting element of the light source. As a result, in particular, an advantageously illuminated operating region may be provided, whereby, in particular, a high level of operating convenience may be achieved.

For example, the second layer unit could at least participate in at least one identification of at least one operating region. Preferably, the second layer unit at least participates in at least one identification of at least one heating region. In particular, the first layer unit and/or the light source participates in the identification of the heating region, in particular in addition to the second layer unit. When viewed perpendicular to a main extension plane of the plate unit, the second layer unit is arranged, in particular, so as to be overlapping at least in some portions with at least one heating region. The second layer unit, for example when viewed perpendicular to a main extension plane of the plate unit, could be arranged at least partially, advantageously at least to a large part and preferably entirely inside a surface extension spanned by the heating region. In particular, the hob device has at least one heating unit and, in particular, at least two, advantageously at least four, particularly advantageously at least eight, preferably at least twelve and particularly preferably a plurality of heating units. The heating units could be arranged, for example, in the form of a matrix and advantageously span and/or define the heating region. The heating region, when viewed perpendicular to a main extension plane of the plate unit, could be, in particular, a surface spanned by the heating units in a mounted state. As a result, optimal lighting properties may be achieved, in particular in the heating region itself, whereby a reliable heating process could be permitted, for example.

It is also proposed that the first layer unit and/or the second layer unit has at least one coating. In particular, alternatively or additionally, the first layer unit and/or the second layer unit could have, for example, at least one lacquer and/or at least one film. As a result, in particular, a proven technique may be used, whereby advantageously a manufacture may be optimized.

For example, the third layer unit could have at least one coating and/or at least one lacquer and/or at least one film. Preferably, the third layer unit has at least one self-adhesive film. The third layer unit has, in particular, at least one layer which has at least one self-adhesive film and advantageously is configured as a self-adhesive film. The third layer unit and/or at least one layer of the third layer unit could have, for example, at least one, in particular self-adhesive, sticker and advantageously could be configured as a self-adhesive sticker. For example, the third layer unit and/or at least one layer of the third layer unit could be configured at least to a large part from at least one plastics material, advantageously from at least one thermoplastic material and preferably from at least one thermoplastic polymer. As a result, in particular, a rapid and/or uncomplicated manufacture and/or mounting may be possible.

It is also proposed that the first layer unit and/or the second layer unit and/or the third layer unit have an at least substantially smooth surface, whereby, in particular, optimal lighting properties may be provided.

Particularly advantageous lighting may be achieved, in particular, by a hob, in particular, by an induction hob, having at least one hob device according to the invention, in particular, having at least one induction hob device according to the invention.

In this case the hob device is not intended to be limited to the above-described use and embodiment. In particular, for fulfilling a mode of operation described herein the hob device may have a number of individual elements, components and units deviating from a number cited herein.

Further advantages emerge from the following description of the drawing. Exemplary embodiments of the invention are shown in the drawing. The drawing, the description and the claims contain numerous features in combination. The person skilled in the art will also expediently consider the features individually and combine them to form further meaningful combinations.

DETAILED DESCRIPTION OF EXEMPLARY EMBODIMENTS OF THE PRESENT INVENTION

Figure 1:
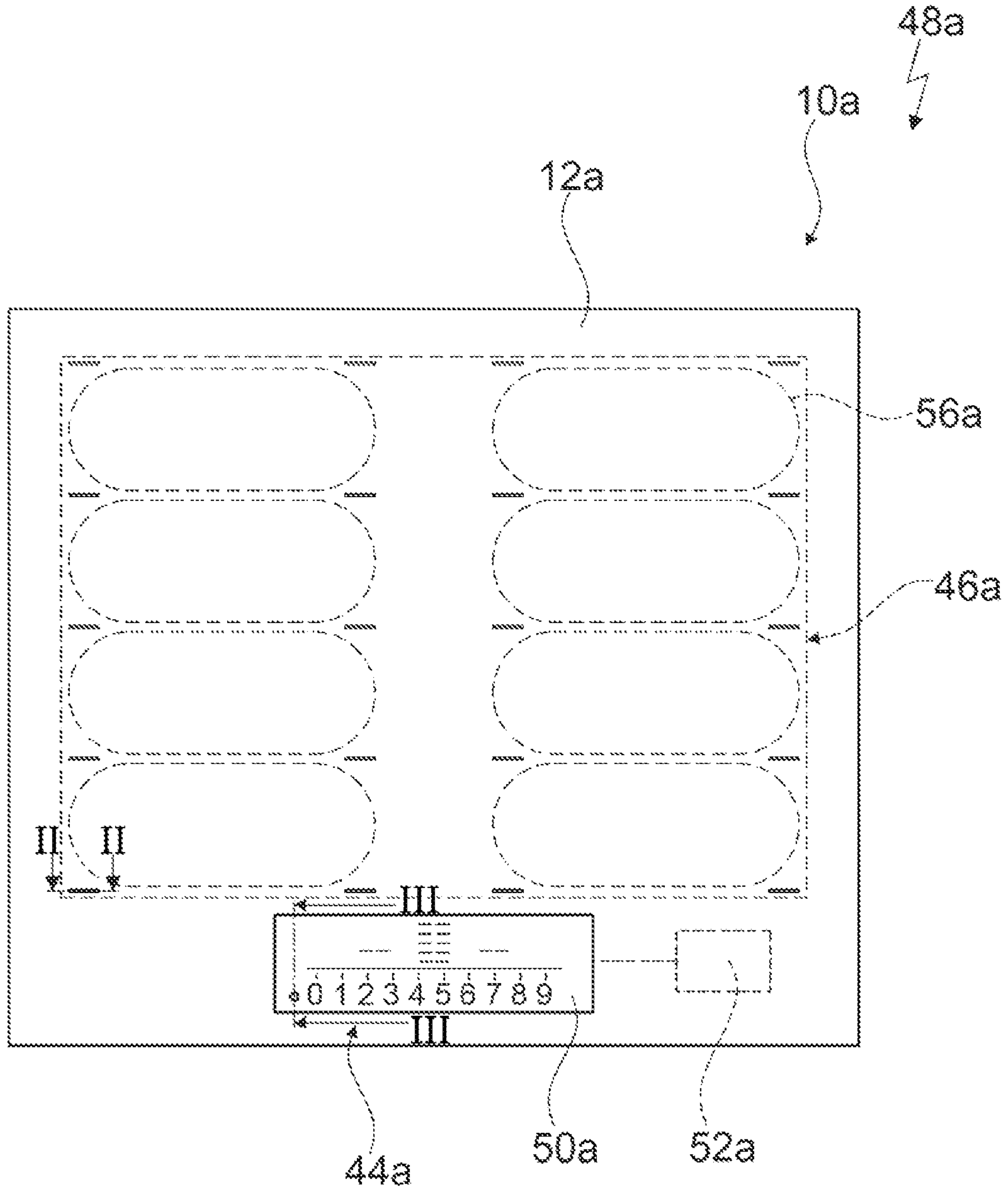
FIG. 1 shows a hob with a hob device in a schematic plan view.

FIG. 1 shows by way of example a hob 48*a* which is configured, in particular, at least partially and advantageously entirely as an induction hob. For example, alternatively or additionally, the hob 48*a* could be configured, for example, at least partially as a resistance hob and/or as a gas hob.

The hob 48*a* has, in particular, at least one and, for example, exactly one hob device 10*a*. The hob device 10*a* could be configured, for example, as a resistance hob device and/or as a gas hob device. In particular, the hob device 10*a* is configured as an induction hob device.

The hob device 10*a* has, in particular, at least one and, for example, exactly one plate unit 12*a*. In the present exemplary embodiment, the plate unit 12*a* is configured, in particular, as a hob plate. In at least one mounted state the plate unit 12*a* forms, in particular, a visible surface which in the mounted state, in particular, is arranged facing a user.

The plate unit 12*a* is provided, in particular, for placing an item of cookware (not shown), in particular, for the purpose of heating the item of cookware. In particular, in a mounted state the plate unit 12*a* forms at least one part of a hob external housing.

The hob device 10*a* has, in particular, at least one heating unit 56*a*. Of the objects which are repeatedly present in the figures, in each case only one is provided with a reference numeral. For example, the hob device 10*a* could have at least two, advantageously at least four, particularly advantageously at least eight, preferably at least twelve and particularly preferably a plurality of heating units 56*a*. The heating units 56*a* could be arranged, for example, in the form of a matrix.

The heating units 56*a* define, in particular, at least one and, for example, exactly one heating region 46*a*. When viewed perpendicular to a main extension plane of the plate unit 12*a*, the heating units 56*a* span, in particular, at least one surface and advantageously the heating region 46*a* which, in particular, corresponds to the surface spanned by the heating units 56*a*. In particular, only one of the heating units 56*a* is described hereinafter.

In an installed position, the heating unit 56*a* is arranged, in particular, below the plate unit 12*a*. The heating unit 56*a* is provided, in particular, to heat at least one item of cookware placed on the plate unit 12*a* above the heating unit 56*a*. The heating unit 56*a* is configured, in particular, as an induction heating unit.

The hob device 10*a* has, in particular, at least one and, for example, exactly one user interface 50*a*. The user interface 50*a* is provided, in particular, for an input and/or selection of operating parameters, such as for example a heating power and/or a heating power density and/or a heating zone. The user interface 50*a* is provided, in particular, for outputting a value of an operating parameter to a user.

The user interface 50*a* defines, in particular, at least one and, for example, exactly one operating region 44*a*. When viewed perpendicular to a main extension plane of the plate unit 12*a*, the user interface 50*a* spans, in particular, at least one surface and advantageously the operating region 44*a* which, in particular, corresponds to the surface spanned by the user interface 50*a*.

The hob device 10*a* has, in particular, at least one and, for example, exactly one control unit 52*a*. In at least one operating state the control unit 52*a* controls and/or regulates, in particular, an appliance main function and/or the heating unit 56*a*. The control unit 52*a* is provided, in particular, to perform actions and/or to change settings as a function of operating parameters input by means of the user interface 50*a*. In the operating state, the control unit 52*a* regulates, in particular, an energy supply to the heating unit 56*a* and namely, in particular, for heating the item of cookware.

Figure 2:
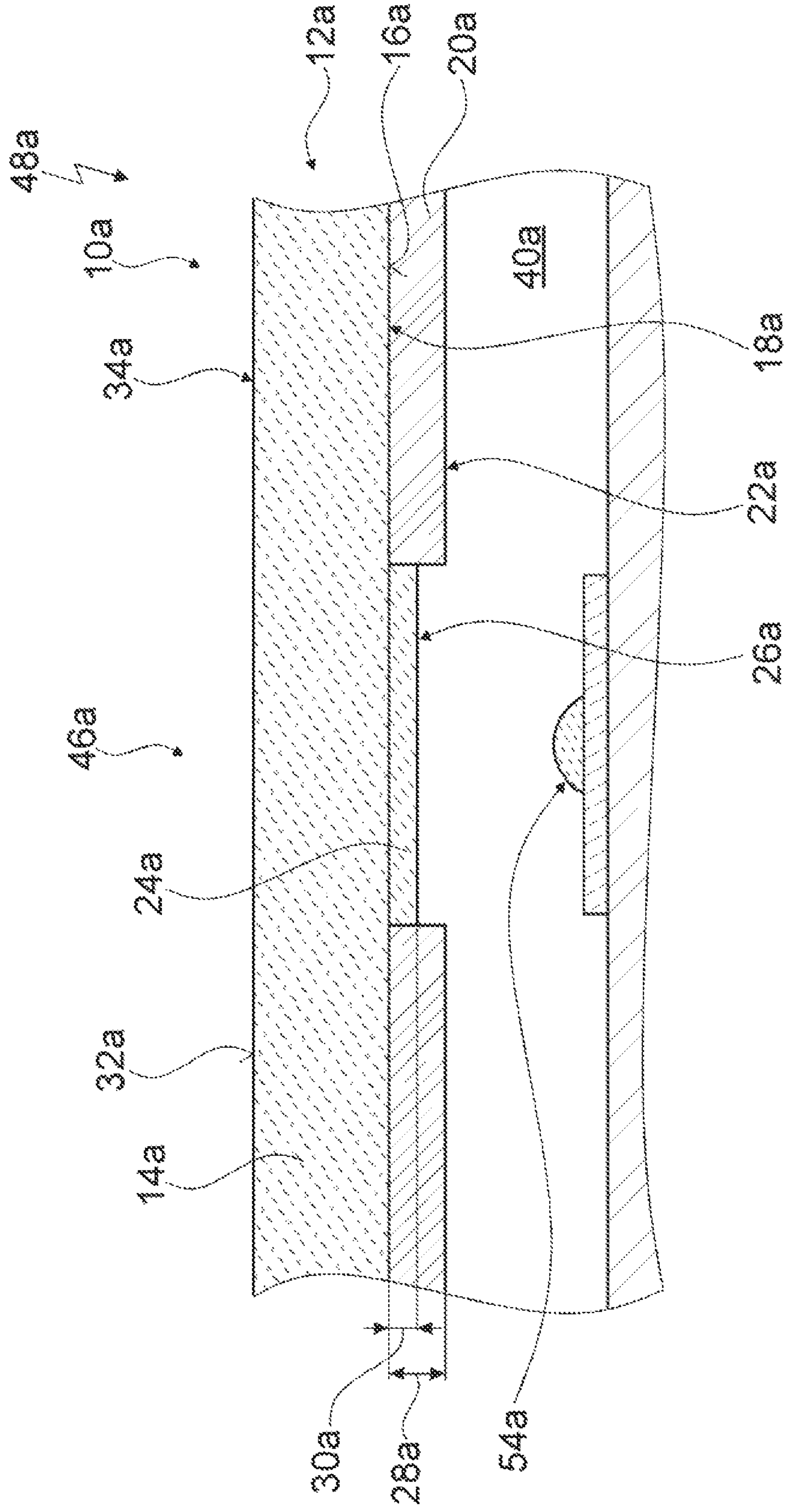
FIG. 2 shows a section along the line II-II of FIG. 1 in a schematic view and FIG. 3 shows a section along the line of FIG. 1 in a schematic view.
Figure 3:
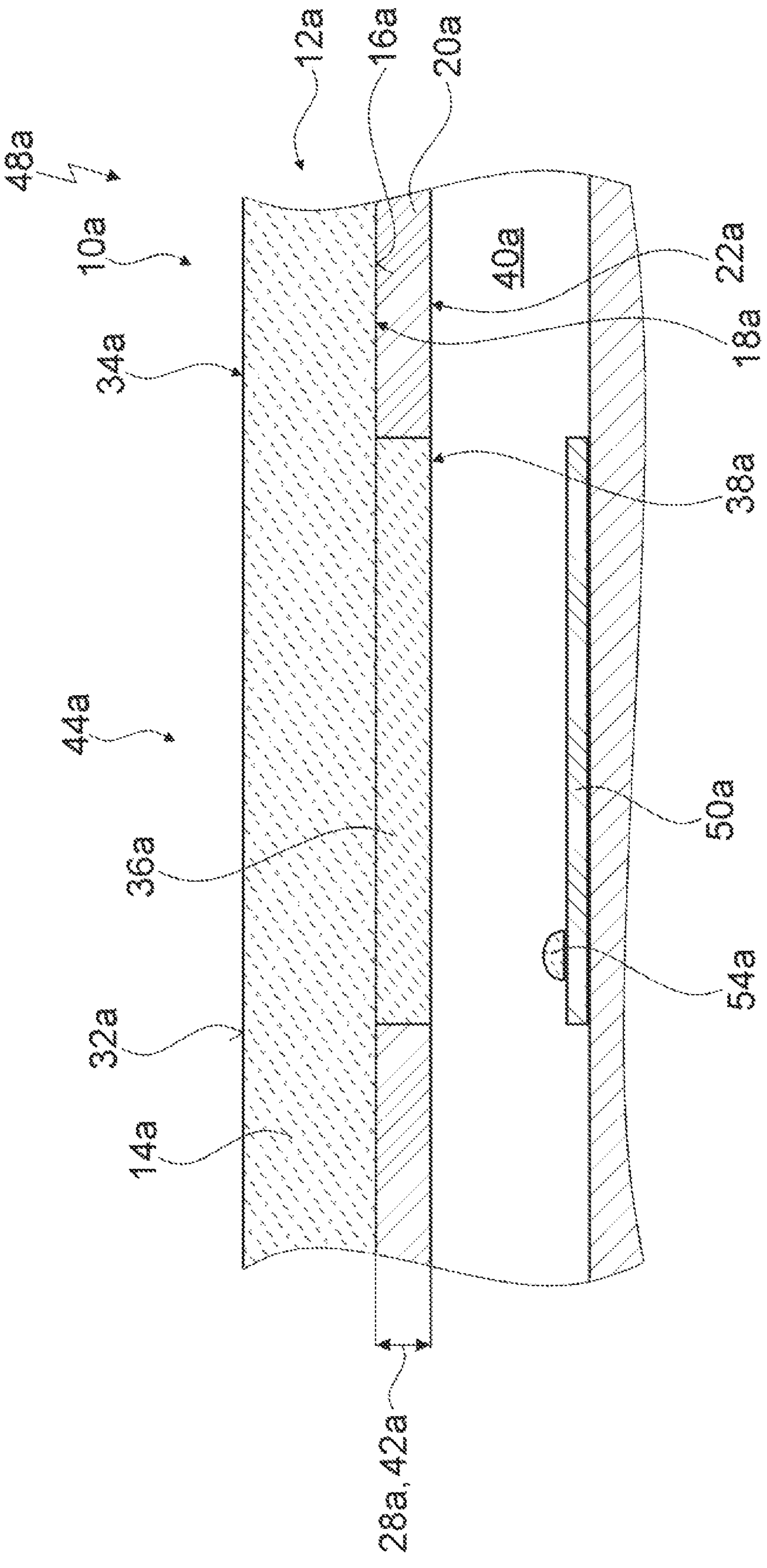

The hob device 10*a* has, in particular, at least one light source 54*a* (see FIGS. 2 and 3). In the present exemplary embodiment, the hob device 10*a* has, in particular, at least two, advantageously at least four, particularly advantageously at least eight, preferably at least twelve and particularly preferably a plurality of light sources 54*a*.

At least one portion of the light sources 54*a*, in particular, is integrated in the user interface 50*a* and/or is part of the user interface 50*a*. The user interface 50*a* has, in particular, at least one portion of the light sources 54*a*. The portion of the light sources 54*a* which is part of the user interface 50*a* is advantageously provided for lighting the operating region 44*a* and/or for participating in an identification of the operating region 44*a*.

In particular, at least one portion of the light sources 54*a*, which advantageously differs from the light sources 54*a* integrated in the user interface 50*a*, is provided for participating in an identification of the heating region 46*a*. Advantageously, the portion of the light sources 54*a*, which advantageously differs from the light sources 54*a* integrated in the user interface 50*a*, is provided for lighting the heating unit 56*a*. In particular, only one of the light sources 54*a* is described hereinafter.

The light source 54*a* is provided, in particular, for providing light, in particular at least visible light. In an operating state, the light source 54*a* provides, in particular, light and advantageously at least visible light. In an installed position, the light source 54*a* is arranged, in particular, below the plate unit 12*a*. Advantageously, in an installed position the light source 54*a* is arranged on a side of the plate unit 12*a* facing away from a user.

The plate unit 12*a* has, in particular, at least one and, for example, exactly one plate main body 14*a*. The plate main body 14*a* has, in particular, an at least substantially smooth surface in at least one surface portion 18*a* on at least one plate side 16*a*. The surface portion 18*a* extends, in particular, over at least a large part of the plate side 16*a*. In an installed position, the plate side 16*a* is configured, in particular, as a lower side of the plate main body 14*a*. In an installed position, the plate side 16*a* is configured, in particular, as a side of the plate main body 14*a* facing away from a user.

The plate main body 14*a* has, in particular, an at least substantially smooth surface in at least one further surface portion 34*a* on at least one further plate side 32*a*. The further surface portion 34*a* extends, in particular, over at least a large part of the further plate side 32*a*. Advantageously, the further plate side 32*a* is arranged opposing the plate side 16*a*. The plate side 16*a* and the further plate side 32*a* are oriented, in particular, at least substantially parallel to a main extension plane of the plate main body 14*a*. In an installed position, the further plate side 32*a* is configured, in particular, as a visible side of the plate main body 14*a*. In an installed position, the further plate side 32*a* is configured, in particular, as a side of the plate main body 14*a* facing a user.

The plate unit 12*a* has, in particular, at least one and, for example, exactly one first layer unit 20*a*. The first layer unit 20*a* is arranged, in particular, in at least one first sub-region 22*a* of the surface portion 18*a*. The first layer unit 20*a* extends, in particular, over at least a large part of the first sub-region 22*a*. The first sub-region 22*a* extends, in particular, over at least a large part of the surface portion 18*a*. Particularly advantageously, the first layer unit 20*a* is at least substantially non-transparent and advantageously non-transparent, in particular, at least relative to visible light.

The plate unit 12*a* has, in particular, for each light source 54*a* assigned to the heating region 46*a*, in particular, at least one and, for example, exactly one second layer unit 24*a*. Only one of the second layer units 24*a* is described hereinafter.

The second layer unit 24*a* is arranged, in particular, in at least one second sub-region 26*a* of the surface portion 18*a*. The second layer unit 24*a* extends, in particular, over at least a large part of the second sub-region 26*a*. The second sub-region 26*a* extends, in particular, over a maximum of 20%, advantageously over a maximum of 15%, particularly advantageously over a maximum of 10%, preferably over a maximum of 5% and particularly preferably over a maximum of 2% of the surface portion 18*a*. Particularly advantageously, the second layer unit 20*a* is provided for scattering light, in particular, at least visible light. In particular, in an operating state, the second layer unit 24*a* scatters light, in particular provided by the light source 54*a*.

The first sub-region 22*a*, when viewed perpendicular to a main extension plane of the plate unit 12*a*, advantageously extends over at least a large part of the plate main body 14*a*. In the present exemplary embodiment, the first sub-region 22*a*, when viewed perpendicular to a main extension plane of the plate unit 12*a*, for example, extends over at least substantially 95% of a surface extension spanned by the plate main body 14*a*.

Advantageously, the first sub-region 22*a* and the second sub-region 26*a* adjoin one another at least in some portions, and namely, in particular when viewed perpendicular to a main extension plane of the plate unit 12*a*. In the present exemplary embodiment, the first sub-region 22*a*, in particular when viewed perpendicular to a main extension plane of the plate unit 12*a*, surrounds and/or delimits and/or defines, in particular, the second sub-region 26*a*.

The second layer unit 24*a*, in particular in an operating state, at least participates in at least one identification of the heating region 46*a*. In the operating state, in particular, at least the second layer unit 24*a* and the light source 54*a* participate in the identification of the heating region 46*a*. For example, in addition, in the operating state at least the plate unit 12*a* could participate in the identification of the heating region 46*a*, for example.

The second layer unit 24*a* has a thickness 30*a*, for example, which in the present exemplary embodiment could assume a value of at least substantially 11 μm, for example. The first layer unit 20*a* has a thickness 28*a*, for example, which in the present exemplary embodiment could assume a value of at least substantially 30 μm, for example. Advantageously, the thickness 28*a* of the first layer unit 20*a* is larger than the thickness 30*a* of the second layer unit 24*a*.

The plate unit 12*a* has, in particular, at least one and, for example, exactly one third layer unit 36*a*. The third layer unit 36*a* is arranged, in particular, in at least one third sub-region 38*a* of the surface portion 18*a*. In particular, the third layer unit 36*a* extends over at least a large part of the third sub-region 38*a*. The third sub-region 38*a* extends, in particular, over a maximum of 25%, in particular over a maximum of 20%, advantageously over a maximum of 15%, particularly advantageously over a maximum of 10%, preferably over a maximum of 7% and particularly preferably over a maximum of 4% of the surface portion 18*a*.

Advantageously, the first sub-region 22*a* and the third sub-region 38*a* adjoin one another at least in some portions and namely, in particular, when viewed perpendicular to a main extension plane of the plate unit 12*a*. In the present exemplary embodiment, the first sub-region 22*a*, in particular when viewed perpendicular to a main extension plane of the plate unit 12*a*, surrounds and/or delimits and/or defines, in particular, the third sub-region 38*a*.

Particularly advantageously, the third layer unit 36*a* is provided at least partially to filter light, in particular at least visible light. In particular, in an operating state, the third layer unit 36*a* filters at least partially light provided, in particular, by the light source 54*a*.

In particular, with the at least partial filtering of the light, in an operating state and/or in an inactivity mode, the third layer unit 36*a* at least partially prevents, in particular, an escape of light from a hob interior 40*a*. The third layer unit 36*a* is provided, in particular, to prevent at least partially an escape of light from the hob interior 40*a*.

In particular, with the at least partial filtering of the light, in an operating state and/or in an operating mode, the third layer unit 36*a* at least partially permits, in particular, an escape of light from the hob interior 40*a*. The third layer unit 36*a* is provided, in particular, to permit at least partially an escape of light form the hob interior 40*a*.

The second layer unit 36*a* has, for example, a thickness 42*a* which in the present exemplary embodiment could assume a value of at least substantially 30 μm, for example. Advantageously, the thickness 42*a* of the third layer unit 36*a* corresponds at least substantially to the thickness 28*a* of the first layer unit 20*a*.

In an operating state, in particular, the third layer unit 36*a* at least participates in at least one identification of the operating region 44*a*. In the operating state, in particular, at least the third layer unit 36*a* and the light source 54*a* participate in the identification of the operating region 44*a*. For example, in addition, in the operating state at least the plate unit 12*a* and/or the user interface 50*a* could participate in the identification of the operating region 44*a*, for example.

In the present exemplary embodiment, the third layer unit 36*a* has, in particular, at least one self-adhesive film. The third layer unit 36*a* is configured, in particular, as a self-adhesive film and advantageously as a self-adhesive sticker.

In the present exemplary embodiment, the first layer unit 20*a* has, in particular, at least one coating. Advantageously, the first layer unit 20*a* could be configured as a multilayered structure and have, in particular, at least two, advantageously at least three, particularly advantageously at least four and preferably a plurality of coatings in order, in particular, to ensure a full non-transparency and/or in order to eliminate defects, such as for example pin holes.

In the present exemplary embodiment, the second layer unit 24*a* has, in particular, at least one coating. The second layer unit 24*a* is configured, in particular, as a coating.

For example, the first layer unit 20*a* and/or the second layer unit 24*a* could be applied by means of at least one screen printing method and/or by means of at least one printing method onto the plate main body 14*a*.

By means of the described embodiment, for example, a high degree of freedom of design regarding lighting could be achieved, whereby desired design requirements and/or a functional lighting design could be achieved, for example.

The invention claimed is:

1. A hob device, comprising:

a plate unit including a plate main body, which has a plate side with an at least substantially smooth surface in a surface portion;

a first layer unit arranged in a first sub-region of the surface portion and being at least substantially non-transparent;

a second layer unit arranged in a second sub-region of the surface portion configured to scatter light;

a third layer unit configured to at least partially filter light and arranged in a third sub-region of the surface portion;

a heating region comprising heating elements; and an operating region comprising a user interface;

wherein the first sub-region surrounds the second sub-region and the third sub-region, wherein the first sub-region and the second sub-region are arranged in the heating region, wherein the second sub-region is configured to identify the heating region, wherein the first sub-region and the third sub-region are arranged in the operating region, and wherein the third sub-region is configured to identify the operating region.

2. The hob device of claim 1, constructed in the form of an induction hob device.

3. The hob device of claim 1, wherein the first sub-region, when viewed perpendicular to a main extension plane of the plate unit, extends over at least a large part of the plate main body.

4. The hob device of claim 1, wherein the first layer unit has a thickness which is larger than a thickness of the second layer unit.

5. The hob device of claim 1, wherein the first sub-region and the second sub-region adjoin one another at least in one portion.

6. The hob device of claim 1, wherein the first sub-region and the third sub-region adjoin one another at least in one portion.

7. The hob device of claim 1, wherein the third layer unit is provided to prevent at least partially an escape of light from a hob interior.

8. The hob device of claim 1, wherein the third layer unit is provided to permit at least partially an escape of light from a hob interior.

9. The hob device of claim 1, wherein the second layer unit participates in an identification of the heating region.

10. The hob device of claim 1, wherein at least one of the first layer unit and the second layer unit includes a coating.

11. The hob device of claim 1, wherein the third layer unit includes a self-adhesive film.

12. A hob, comprising a hob device which comprises:

a plate unit including a plate main body, which has a plate side with an at least substantially smooth surface in a surface portion, a first layer unit arranged in a first sub-region of the surface portion and being at least substantially non-transparent;

a second layer unit arranged in a second sub-region of the surface portion and configured to scatter light;

a third layer unit configured to at least partially filter light and arranged in a third sub-region of the surface portion;

a heating region comprising heating elements; and an operating region comprising a user interface;

wherein the first sub-region surrounds the second sub-region and the third sub-region, wherein the first sub-region and the second sub-region are arranged in the heating region, wherein the second sub-region is configured to identify the heating region, wherein the first sub-region and the third sub-region are arranged in the operating region, and wherein the third sub-region is configured to identify the operating region.

13. The hob of claim 12, constructed in the form of an induction hob.

* * * * *